United States Patent
Nishijima et al.

[11] Patent Number: 5,985,367
[45] Date of Patent: Nov. 16, 1999

[54] PROCESS FOR PREPARING COATED PRINTING PAPER

[75] Inventors: Eiji Nishijima; Yuji Sato; Yasunori Nanri; Shoichi Miyawaki, all of Iwakuni, Japan

[73] Assignee: Nippon Paper Industries Co., Ltd., Tokyo, Japan

[21] Appl. No.: 09/152,685

[22] Filed: Sep. 14, 1998

[30] Foreign Application Priority Data

Sep. 12, 1997 [JP] Japan ................................. 9-249078
Sep. 29, 1997 [JP] Japan ................................. 9-263943

[51] Int. Cl.$^6$ ............................ B05D 3/12; B05D 5/04
[52] U.S. Cl. .................. 427/361; 427/365; 427/391; 427/395; 427/411; 106/464; 162/136; 162/137
[58] Field of Search ...................... 427/361, 365, 427/391, 395, 411; 106/464; 162/136, 137

[56] References Cited

U.S. PATENT DOCUMENTS

| 4,244,933 | 1/1981 | Shibazaki et al. ..................... 423/430 |
| 4,515,833 | 5/1985 | Nojima et al. ......................... 427/362 |
| 5,275,651 | 1/1994 | Minayoshi et al. ..................... 106/464 |

FOREIGN PATENT DOCUMENTS

| 53-073498 | 6/1978 | Japan . |
| 59-026927 | 2/1984 | Japan . |
| 1-301510 | 12/1989 | Japan . |
| 3-124896 | 5/1991 | Japan . |
| 3-183618 | 8/1991 | Japan . |
| 4370298A | 12/1992 | Japan . |
| 55297A | 1/1993 | Japan . |
| 5117995A | 5/1993 | Japan . |
| 5214699A | 8/1993 | Japan . |
| 6-056422 | 3/1994 | Japan . |
| 6073695A | 3/1994 | Japan . |
| 6073697A | 3/1994 | Japan . |
| 6073698A | 3/1994 | Japan . |
| 6-116897 | 4/1994 | Japan . |
| 6212599A | 8/1994 | Japan . |
| WO9825852 | 6/1998 | WIPO . |
| WO9825853 | 6/1998 | WIPO . |

*Primary Examiner*—Erma Cameron
*Attorney, Agent, or Firm*—Roylance, Abrams, Berdo & Goodman, L.L.P.

[57] ABSTRACT

A process for preparing a coated printing paper by applying a coating solution containing a pigment and an adhesive to a base paper, which comprises coating the base paper with the coating solution containing 30 to 90% by weight, based on 100% by weight of pigment components, of rice grain- or spindle-shaped precipitated calcium carbonate as a pigment component, the precipitated calcium carbonate being produced by slaking calcium oxide with a white liquor, followed by causticization with a green liquor, at a causticizing step during pulp production by the sulfate process or the soda process; whereby the coated printing paper free from uneven gloss, mottling, and trapping unevenness, and excellent in ink drying properties and operability with a blade coater is provided.

8 Claims, No Drawings he present invention relates to a coated printing paper, and more specifically, to a process for preparing a coated printing paper having excellent printability and producible at low cost. This invention claims the priority of Japanese Application Nos. 9-249078 filed on Sep. 12, 1997 and 9-263943 filed on Sep. 29, 1997. The disclosures of these two applications are hereby incorporated by reference.

PROCESS FOR PREPARING COATED PRINTING PAPER

BACKGROUND OF THE INVENTION

The present invention relates to a coated printing paper, and more specifically, to a process for preparing a coated printing paper having excellent printability and producible at low cost. This invention claims the priority of Japanese Application Nos. 9-249078 filed on Sep. 12, 1997 and 9-263943 filed on Sep. 29, 1997. The disclosures of these two applications are hereby incorporated by reference.

In recent years, a demand for printing papers has been growing in commercial printing fields targeted at advertisements such as hand bills, catalogues, pamphlets and direct mails. These commercial prints are low in price as merchandise. However, it is important for them to attain their intended object as advertising media. Thus, there has been a high demand for these printed products with a satisfactory finish at a low cost.

To satisfy such a demand for high quality coated papers, paper manufacturers have been attempting to increase productivity while maintaining high quality, thereby cutting down on costs. Thus, they are using less expensive materials and chemicals, and endeavoring to produce highly cost-competitive products by (1) speeding, (2) broadening, (3) online manufacturing (production from paper making through coating to surface finishing), and (4) multiple coating. This has recently tended to make on-machine blade coating a popular means of production. Since this method performs paper making, coating, and surface finishing in the same plant, an apparatus (sheet run) used is very long. Once paper break occurs during operation in this situation, high production loss results, or paper feeding may require time or labor. Thus, efforts have been made to raise the manufacturing efficiency by maximizing labor- and space-saving. With this background, the necessity for minimizing the length of a drying zone has resulted in a tendency that a coating solution containing a pigment and an adhesive is coated on a base paper, and then as strong drying as possible is performed. To increase the evaporation rate, this drying is carried out at a dry-bulb temperature of 140° C. or higher and an air pressure of 80 mmAq or higher. Radical drying, however, leads to marked migration of the binder (starch, latex) in the coating solution, increasing the frequency of printing nonuniformities, namely, mottling (uneven gloss in the single-color solid-printed area) and trapping unevenness (printing nonuniformity during multiple printing). These printing nonuniformities basically result from the nonuniform absorbing quality that the coated layer has for a printing ink, or its nonuniform water absorbing properties for damping water. Ideally, it is necessary to apply a coating solution more uniformly onto a base paper with minimal texture unevenness, thereby forming a coated layer having a uniform void structure with little density unevenness (Nishioka et al.; Journal of the Technical Association of the Pulp and Paper Industry, 41(3), 1987).

To correct gloss unevenness and printing nonuniformities, we have conducted studies on methods for forming a coated layer having a more uniform void structure. For example, we have found in our prior applications (Japanese Unexamined Patent Publication Nos. 370298/92 and 361695/92) that printing nonuniformities can be resolved by a method of wetting and heating a base paper or a coated paper, and then soft calendering it at a high temperature. We have also found in Japanese Patent Application No. 77862/97 that printing nonuniformities can be resolved by a method using a latex having a specific particle diameter, and starch having a specific reducing end group as well as a specific molecular weight.

In recent years, reductions in paper costs, and the use of thinner and lighter papers have been trends. With thinner papers, correction of opacity and print through is becoming a serious challenge for paper manufacturers. Thus, many attempts have been made to use spindle-shaped or columnar precipitated calcium carbonate having a large specific surface area as a coating pigment. From this point of view, the inventors have also used precipitated calcium carbonate having a special shape (spindle-shaped or columnar) as a pigment for a coated paper, and found methods for correcting opacity, resolving print through, and improving brightness (Japanese Unexamined Patent Publication Nos. 73695/94 and 73698/94). However, these methods were both applied to gravure paper employed with a different printing system. Mottling and trapping unevenness, problems characteristic of offset printing, remained unsolved with such use.

The precipitated calcium carbonate having a specific shape in customary use was produced by the reaction between milk of lime and carbon dioxide (called the carbon dioxide process) that followed a conventional manufacturing method. Thus, this material was high in unit price similar to kaolin, and using such precipitated calcium carbonate instead of cheap heavy calcium carbonate inevitably led to a marked increase in the manufacturing cost. We have also found that the use of spindle-shaped precipitated calcium carbonate, obtained by the carbon dioxide process, for an offset printing paper resulted in slow drying of ink. Since slow ink drying leads to set-off, ink drying properties should be improved further.

With the speeding of blade coating as stated earlier, the frequency of occurrence of stalactite or a bleeding problem (deposition of an aggregate from the coating solution on the edge of the blade) is known to increase. The coating solution using precipitated calcium carbonate having a special shape such as a fusiform, acicular or columnar shape tends to increase in viscosity at a high shear rate. This solution may slow high-speed operation using the blade.

SUMMARY OF THE INVENTION

The present invention has been accomplished under the above-mentioned circumstances. Its object is to provide a coated printing paper free from uneven gloss, mottling, and trapping unevenness, having excellent ink drying properties, and possessing high operability with a blade coater. To attain this object, the inventors have conducted extensive studies, and achieved the present invention by applying a coating solution containing 30 to 90% by weight, based on 100% by weight of pigment components, of rice grain- or spindle-shaped precipitated calcium carbonate as a pigment component. The precipitated calcium carbonate has a major diameter of 4.0 $\mu$m or less and a minor diameter of 0.2 to 0.7 $\mu$m, and is produced by slaking calcium oxide with white liquor, followed by causticization with green liquor, at a causticizing step during pulp production by the sulfate process or the soda process. Details of this invention will be offered below.

The inventors have found that a coated printing paper free from uneven gloss, mottling and trapping unevenness, and having excellent ink drying properties and high operability can be produced at a low cost by incorporating rice grain- or spindle-shaped precipitated calcium carbonate prepared by a causticization step.

In the present invention, the rice grain- or spindle-shaped precipitated calcium carbonate prepared by the causticization step accounts for 30 to 90% by weight of all pigments. For a calendered coated paper, the proportion is preferably 30 to 80% by weight. If this proportion is less than 30% by weight, the effect of correcting uneven gloss, mottling, and trapping unevenness is reduced. At a proportion of more than 90% by weight, the viscosity of the coating solution is so high that the operability of the coated paper is markedly impaired. The use of precipitated calcium carbonate having a shape other than the shape of a rice grain or a spindle caused uneven gloss and trapping unevenness.

For a coated printing paper, kaolin and heavy calcium carbonate as pigments in the form of fine particles are usually used in combination. Kaolin having a plate-like shape can be easily oriented during surface finishing with a calender, and is not necessarily uniform in shape. Thus, it undergoes nonuniform orientation partially, and this uneven orientation may lead to uneven gloss. A coated layer composed of this kaolin liable to uneven orientation and heavy calcium carbonate with a broad particle diameter distribution may frequently face uneven density and unevennesses in the void structure, thereby causing mottling or trapping unevenness due to uneven penetration of printing ink. The rice grain- or spindle-shaped precipitated calcium carbonate obtained by the present invention is more uniform in particle diameter distribution and is in a slender shape, so that it may minimally undergo uneven orientation. Thus, a relatively uniform void structure is formed in the coated layer, which may be free from uneven gloss, mottling, and trapping unevenness.

According to the present invention, uneven gloss, mottling, and trapping unevenness present problems only in a calendered coated paper calendered so as to have white paper glossiness of higher than 50%. On the other hand, a dull finish coated paper calendered so as to have white paper glossiness of 50% or less, is subjected to a low calendering linear pressure. A matte finish coated paper is not calendered and used as it is. Thus, differences in uneven orientation, uneven density and uneven void structure among pigments minimally emerge, thus posing no problems. However, set-off due to slow ink drying properties were problematical regardless of white paper glossiness.

With the invention, it is important to use the rice grain- or spindle-shaped precipitated calcium carbonate prepared by the causticization step. The use of rice grain- or spindle-shaped precipitated calcium carbonate prepared by the carbon dioxide process rather than the causticization reaction presented the problem of slowing ink drying. It is not clear why the causticization-based rice grain- or spindle-shaped precipitated calcium carbonate according to the invention is better in ink drying properties than the conventional precipitated calcium carbonate prepared by the carbon dioxide process. However, the precipitated calcium carbonate produced by the method of the invention was markedly different from that prepared by the carbon dioxide process in terms of wettability with various liquids (evaluation of immersion heat; twin-type conduction calorimeter MMC5111, a product of Tokyo Rikosha). The precipitated calcium carbonate of the invention was low in wettability with water, but was highly wettable with an ink solvent. It is unclear from which part of the manufacturing method this difference in wettability results. However, the precipitated calcium carbonate obtained by the method of the invention is highly compatible with ink, and thus may quicken ink drying.

The rice grain- or spindle-shaped precipitated calcium carbonate according to the invention has a predetermined particle diameter. If its major diameter is less than 0.5 μm, or its minor diameter is less than 0.2 μm, the viscosity of the coating solution becomes too high. Thus, when a blade coater is used as a coating machine, for example, stalactite or bleeding can occur frequently, considerably impairing operability. With a minor diameter of greater than 0.7 μm, the mean particle diameter increases, and tends to decrease white paper glossiness and smoothness. At a major diameter of larger than 4.0 μm, the particles are prone to be snagged on the edge of the blade, causing streaks frequently.

Only by using the precipitated calcium carbonate having a particular shape produced by the above-described method, can a coated printing paper be produced at a low cost which is free from uneven gloss, mottling, and trapping unevenness, having excellent ink drying properties, and high in operability with a blade coater.

In accordance with the present invention, the use of the rice grain- or spindle-shaped precipitated calcium carbonate prepared by the causticization step can also correct ink erasure, a problem characteristic of a dull finish coated paper and a matte finish coated paper. The ink erasure refers to the problem that printing ink migrates to the surface of white paper and debases the quality of printed matter badly, (1) when a printed surface of a cover and a white paper surface of a back cover contact in a stack of sheets at a step after offset printing to cause rubbing, or (2) when a printed area and a white paper area of a material for publication are contacted with each other in a folding machine or a gathering machine during the bookbinding process.

PREFERRED EMBODIMENTS OF THE INVENTION

The precipitated calcium carbonate having a specific shape defined in the present invention is one prepared at a causticizing step during pulp production by the sulfate process or the soda process. In pulp production by the sulfate process or the soda process, chips are cooked at a high temperature and a high pressure using a liquor comprising a mixture of sodium hydroxide and sodium sulfate to isolate cellulose in the wood. The cellulose is separated and purified as a solid phase to make pulp. The liquor and dissolved components other than cellulose from the wood are recovered as a black liquor, and concentrated to a concentration combustible by a recovery boiler. To supplement the sodium content and the sulfur content eliminated by a series of steps, sodium sulfate is added, and the mixture is burned in the recovery boiler. At this time, the organic materials in the black liquor are recovered as a heat source, while the inorganic materials are recovered mainly as sodium carbonate and sodium sulfate. These inorganic materials are called smelt, which is withdrawn from the recovery boiler in molten condition. The smelt from the recovery boiler is dissolved in water or a weak liquor (a liquid obtained after washing calcium carbonate with water, and containing a trace amount of a white liquor component) to form a green liquor.

The causticization step is a step for converting sodium carbonate in the green liquor into sodium hydroxide as a digesting chemical. This step comprises (1) a slaking reaction for converting calcium oxide to hydrated lime, and (2) a causticizing reaction for mixing hydrated lime and green liquor to form sodium hydroxide and calcium carbonate. A liquid of sodium hydroxide obtained by the causticizing reaction is called a white liquor, which is separated from calcium carbonate, cleared, and fed to the cooking step. In the present invention, the calcium carbonate that has been separated, recovered and fully washed with water is used.

$$CaO + H_2O \rightarrow Ca(OH)_2 \quad \text{(1): Slaking reaction}$$

$$Ca(OH)_2 + Na_2CO_3 \rightarrow CaCO_3 + 2NaOH \quad \text{(2): Causticizing reaction}$$

This calcium carbonate is a by-product formed during production of white liquor to be used as a liquor for the pulp production process. Thus, it can be prepared at a very low cost, compared with precipitated calcium carbonate which is obtained by the conventional method relying on the reaction between milk of lime and carbon dioxide.

Furthermore, the rice grain- or spindle-shaped precipitated calcium carbonate defined in the present invention is prepared by the following two-stage manufacturing method: To calcium oxide (1) which has been formed in a causticizing step and/or introduced from outside the causticizing step and (2) which contains 0.1 to 10% by weight of calcium carbonate, a white liquor is added to a calcium oxide concentration of 0.5 to 60% by weight, and the mixture is slaked with stirring or blending to form milk of lime and/or lime mud. To the milk of lime and/or lime mud, a green liquor in a predetermined amount necessary to produce the white liquor occurring at the causticizing step is sequentially added at a rate of 0.02 to 50 ml (green liquor)/min/g(calcium oxide) based on the milk of lime and/or lime mud, followed by the causticizing reaction at a reaction temperature of 20 to 105° C.

Pigments to be used other than the above precipitated calcium carbonate are not restricted. However, the precipitated calcium carbonate may be combined with one or more inorganic pigments, such as heavy calcium carbonate, other precipitated calcium carbonate, kaolin, clay, delaminated clay, talc, satin white, silica, barium sulfate, calcium sulfate, zinc oxide and titanium dioxide, and organic pigments such as plastic pigments, the pigments in general use for a coated printing paper.

An adhesive for use in a coating solution in the invention is one or more adhesives selected, where necessary, from latices or other water borne adhesives. The latices are conjugated diene copolymer latices such as styrene-butadiene copolymer and methacrylate-butadiene copolymer, vinyl polymer latices such as polymers or copolymers of acrylic ester and/or methacrylic ester, or these latices further modified with monomers containing a functional group such as a carboxyl group.

Examples of the water borne adhesives other than the latices are ordinary coating adhesives including proteins such as casein, soybean protein, or synthetic protein, synthetic resin adhesives such as polyvinyl alcohol, polyvinyl pyrrolidone, olefin-maleic anhydride resin, or melamine resin, starches such as oxidized starch, cationic starch, enzyme-modified starch, cold water soluble starch, esterified starch (e.g., urea phosphate esterified starch), etherified starch (e.g., hydroxyethyl etherified starch), or dextrin, and cellulose derivatives such as carboxymethyl cellulose, hydroxyethyl cellulose, or hydroxymethyl cellulose.

The coating solution of the invention may further include various auxiliaries, such as dispersing agents, thickening agents, water retaining agents, anti-foaming agents, and waterproofing agents, which are incorporated into ordinary pigments for coated papers.

The preferred base paper is a base paper weighing 30 to 150 g/m², more preferably, 30 to 100 g/m², to be used for an ordinary coated printing paper. Depending on the purpose, wood free paper, or paper with a chemical pulp content of 70% or more is selected and used.

The thus prepared coating composition is applied in a single layer or multiple layers onto the base paper by means of an on-machine or off-machine coater provided with an applicator, such as blade coater, air knife coater, roll coater, or bar coater, which is used in ordinary coated paper production. The concentration of the coating solution is preferably within the range of 35 to 68%, more preferably within the range of 45 to 68%, and the amount coated per surface is preferably 2 to 20 g/m², more preferably 6 to 20 g/m² on a solids basis.

For high speed coating, in particular, it is preferred to use a roll application type or fountain nozzle type on-machine blade coater.

The coated paper having the base paper on which the coating solution has been coated in the above manner and then dried is used as it is, or after calendering (super calender, soft calender, gloss calendar or matte calendar).

EXAMPLES

The present invention will be described concretely with reference to Examples, which are given for illustrative purposes and do not restrict the invention. In the Examples, parts and % represent parts by weight and % by weight, respectively.

<quality evaluation methods>
(1) Morphology of precipitated calcium carbonate: Wash the product with water, filter, dry, and then measure the shape, the average minor diameter and the average major diameter under a scanning electron microscope (JSM-5300, JEOL Ltd.).
(2) White paper glossiness: Measure at an angle of 75 degrees in accordance with JIS P-8142.
(3) Smoothness: Measure with an Oken type smoothness tester.
(4) Evaluation of stalactite: Visually evaluate the status of stalactite occurrence during blade coating.
◎: No occurrence of stalactite, ○: Stalactite occurs slightly, Δ: Stalactite occurs in a large amount, X: Stalactite occurs in a very large amount.
(5) Evaluation of streaks: Visually evaluate the status of streak occurrence during blade coating.
◎: No occurrence of streaks, ○: A few streaks occur, Δ: Many streaks occur, X: Very many streaks occur.
(6) Uneven gloss: Visually evaluate unevenness of fine gloss of the product that has been coated and then calendered.
◎: Little unevenness of gloss, ○: Unevenness of gloss occurs slightly, Δ: Unevenness of gloss occurs considerably, X: Unevenness of gloss occurs markedly.
(7) Evaluation of mottling: Solid-print by means of a printing press RI-II (Akira Seisakujo) using 0.22 ml of a red ink (GSL, SAKATA INX CORP.), and visually evaluate unevenness of ink adhesion (inconsistencies in ink density on the printed surface).
◎: Little mottling, ○: Mottling occurs slightly, Δ: Mottling occurs considerably, X: Mottling occurs markedly.
(8) Evaluation of trapping unevenness: Print at a constant rate by means of a printing press RI-II (Akira Seisakujo) using 0.60 ml of a yellow ink (TK Highplus, TOYO INK MFG. CO., LTD.), 30 seconds later, print at a constant rate using 0.2 ml of a TK Highplus red ink, and visually evaluate the degree of unevenness.
◎: Little trapping unevenness, ○: Trapping unevenness occurs slightly, Δ: Trapping unevenness occurs, X: Trapping unevenness occurs markedly.
(9) Ink drying properties: Print at a constant rate by means of a printing press RI-II (Akira Seisakujo) using 0.50 ml of a black printing ink (TK Mark V New 617, TOYO INK MFG. CO., LTD.), and 45 seconds later, transfer a printed sample to a transfer paper (a wood free coated paper; Npi Coat <73>, a product of Nippon Seishi). Visually make a relative evaluation of a drop in the brightness of the transfer paper. A great drop in brightness represents slow ink drying and poor ink drying properties.

⊚: Excellent ink drying properties, ◯: Good ink drying properties, Δ: Poor ink drying properties, X: Very poor ink drying properties.

(10) Evaluation of ink erasure: Allow a test paper, which has been printed by means of a printing press RI-II (Akira Seisakujo) using a black printing ink (TK Mark V New 617, TOYO INK MFG. CO., LTD.), to stand for a whole day. Then, contact the printed test paper with a white paper, and rub them against each other 20 times in a reciprocating manner at a rate of 43 rubs/min under a load of 2 pounds by the use of Southerland Rubtester (a product of Toyo Seiki). Visually make a relative evaluation of the ink concentration that has migrated from the printed paper to the white paper.

⊚: Little ink erasure, ◯: Ink erasure occurs slightly, Δ: Ink erasure occurs considerably, X: Ink erasure occurs markedly.

Example 1

To a pigment comprising 50 parts of rice grain-shaped precipitated calcium carbonate with a major diameter of 1.8 μm and a minor diameter of 0.3 μm produced by a causticizing step during a kraft pulp production process, 10 parts of heavy calcium carbonate, and 40 parts of kaolin, 0.3 part of a sodium polyacrylate-based dispersing agent was added. The mixture was dispersed in water by means of a Cowless dissolver. To the dispersion, 4 parts of phosphated starch and 11 parts of styrene-butadiene copolymer latex were added as adhesives to prepare a coating solution having a solids concentration of 65%.

The coating solution was coated on both surfaces of a bleached hardwood kraft pulp base paper weighing 54 g/m² at a coating rate of 1,300 m/min by the use of a high-speed fountain blade coater to a coating amount of 13 g/m² on a solids basis per surface. Then, the coated paper was strongly dried with 4 zones of airfoil dryers each at a drying temperature of 160° C. and an air pressure of 100 mmAq. The dried paper was further soft calendered (160° C., 300 kg/cm, 2 nips).

Example 2

A coated paper was produced in the same manner as in Example 1, except for the use of a pigment comprising 60 parts of spindle-shaped precipitated calcium carbonate with a major diameter of 3.0 μm and a minor diameter of 0.4 μm produced by a causticizing step during a kraft pulp production process, and 40 parts of kaolin.

Example 3

A coated paper was produced in the same manner as in Example 2, except that the minor diameter of the spindle-shaped precipitated calcium carbonate was 0.75 μm.

Comparative Example 1

A coated paper was produced in the same manner as in Example 1, except that 95 parts of rice grain-shaped precipitated calcium carbonate and 5 parts of kaolin were used.

Comparative Example 2

A coated paper was produced in the same manner as in Example 2, except that 10 parts of spindle-shaped precipitated calcium carbonate and 50 parts of heavy calcium carbonate were used.

Comparative Example 3

A coated paper was produced in the same manner as in Example 1, except for the use of conventional rice grain-shaped precipitated calcium carbonate produced by the reaction between milk of lime and carbon dioxide.

Comparative Example 4

A coated paper was produced in the same manner as in Example 1, except for the use of conventional spindle-shaped precipitated calcium carbonate produced by the reaction between milk of lime and carbon dioxide.

Comparative Example 5

A coated paper was produced in the same manner as in Example 1, except for the use of unshaped precipitated calcium carbonate having a mean particle diameter of 0.68 μm that had been produced by a causticizing step during a kraft pulp production process.

Comparative Example 6

A coated paper was produced in the same manner as in Example 1, except for the use of a pigment comprising 60 parts of unshaped heavy calcium carbonate having a mean particle diameter of 0.68 μm and 40 parts of kaolin.

The results of the tests on the resulting coated papers are shown in Table 1.

TABLE 1

|  | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| Precipitated calcium carbonate: |  |  |  |  |  |  |  |  |  |
| Shape | Rice grain | Spindle | Spindle | Rice grain | Spindle | Rice grain | Spindle | Unshaped | Unshaped |
| Production method | Causti-cization | Causti-cization | Causti-cization | Causti-cization | Causti-cization | Carbon dioxide process | Carbon dioxide process | Causti-cization | — |
| Major diameter μm | 1.8 | 3.0 | 3.0 | 1.8 | 3.0 | 1.8 | 1.8 | 0.68* | 0.68* |
| Minor diameter μm | 0.3 | 0.4 | 0.75 | 0.3 | 0.4 | 0.3 | 0.3 |  |  |
| Precipitated calcium carbonate content, parts | 50 | 60 | 60 | 95 | 10 | 50 | 50 | 50 | 0 |
| Heavy calcium carbonate content, parts | 10 | 0 | 0 | 0 | 50 | 10 | 10 | 10 | 60 |

TABLE 1-continued

|  | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| Kaolin content, parts | 40 | 40 | 40 | 5 | 40 | 40 | 40 | 40 | 40 |
| White paper glossiness % | 68 | 68 | 66 | 65 | 66 | 68 | 68 | 65 | 65 |
| Smoothness seconds | 1900 | 2000 | 1700 | 1600 | 1750 | 1900 | 1850 | 1700 | 1700 |
| Stalactite | ⊚ | ⊚ | ⊚ | × | ⊚ | ⊚ | ⊚ | ⊚ | ⊚ |
| Streaks | ⊚ | ⊚ | ⊚ | × | ⊚ | ⊚ | ⊚ | ⊚ | ⊚ |
| Uneven gloss | ⊚ | ⊚ | ⊚ | ⊚ | Δ | ⊚ | ⊚ | Δ | × |
| Mottling | ⊚ | ⊚ | ⊚ | ⊚ | Δ | ⊚ | ⊚ | × | × |
| Trapping unevenness | ⊚ | ⊚ | ⊚ | ⊚ | Δ | ⊚ | ⊚ | × | × |
| Ink drying properties | ⊚ | ⊚ | ⊚ | ⊚ | ○ | × | × | ○ | ○ |

*Mean particle diameter (median): Measured with a centrifugal precipitation particle size distribution measuring device (a product of Seishin Kigyo)

As shown in Table 1, the coated papers of Examples 1 to 3 had high white paper glossiness, excellent in smoothness and operability, and minimal in uneven gloss, mottling, and trapping unevenness. The coated paper of Comparative Example 1, on the other hand, caused formation of stalactite, streaks and was poor in operability. The coated paper of Comparative Example 2 was inferior in uneven gloss, mottling, and trapping unevenness. The coated papers of Comparative Examples 3 and 4 were poor in ink drying properties, while the coated papers of Comparative Examples 5 and 6 were unsatisfactory in terms of uneven gloss, mottling, and trapping unevenness.

Similar tests were conducted on the following matte finish coated papers with low white paper glossiness:

Example 4

To a pigment comprising 45 parts of rice grain-shaped precipitated calcium carbonate with a major diameter of 1.8 pm and a minor diameter of 0.4 μm produced by a causticizing. step during a kraft pulp production process, 20 parts of heavy calcium carbonate, and 35 parts of kaolin, 0.6 part of a sodium polyacrylate-based dispersing agent was added. The mixture was dispersed in water by means of a Cowless dissolver. To the dispersion, 6 parts of phosphated starch and 10 parts of styrene-butadiene copolymer latex were added as adhesives to prepare a coating solution having a concentration of 63%.

The coating solution was coated on both surfaces of a bleached hardwood kraft pulp base paper weighing 75 g/m² by the use of a fountain blade coater to a coating amount of 14 g/m² on a solids basis per surface. Then, the coated paper was dried, and used unchanged as a product.

Example 5

A coated paper was produced in the same manner as in Example 4, except for the use of a pigment comprising 70 parts of rice grain-shaped precipitated calcium carbonate with a major diameter of 3.0 μm and a minor diameter of 0.6 μm produced by a causticizing step during a kraft pulp production process, and 30 parts of kaolin.

Example 6

A coated paper was produced in the same manner as in Example 4, except for the use of a pigment comprising 60 parts of spindle-shaped precipitated calcium carbonate with a major diameter of 2.0 μm and a minor diameter of 0.35 μm produced by a causticizing step during a kraft pulp production process, and 40 parts of kaolin.

Example 7

A coated paper was produced in the same manner as in Example 4, except for the use of spindle-shaped precipitated calcium carbonate with a major diameter of 4.5 μm and a minor diameter of 0.8 μm produced by a causticizing step during a kraft pulp production process.

Comparative Example 7

A coated paper was produced in the same manner as in Example 6, except for the use of a pigment comprising 15 parts of spindle-shaped precipitated calcium carbonate with a major diameter of 2.0 μm and a minor diameter of 0.35 μm produced by a causticizing step during a kraft pulp production process, 45 parts of heavy calcium carbonate, and 40 parts of kaolin.

Comparative Example 8

A coated paper was produced in the same manner as in Example 7, except for the use of 95 parts of rice grain-shaped precipitated calcium carbonate with a major diameter of 1.8 μm and a minor diameter of 0.4 μm produced by a causticizing step during a kraft pulp production process, and 5 parts of kaolin.

Comparative Example 9

A coated paper was produced in the same manner as in Example 4, except for the use of conventional rice grain-shaped precipitated calcium carbonate produced by the reaction between milk of lime and carbon dioxide.

Comparative Example 10

A coated paper was produced in the same manner as in Example 4, except for the use of conventional spindle-shaped precipitated calcium carbonate with a major diameter of 2.0 μm and a minor diameter of 0.35 μm produced by the reaction between milk of lime and carbon dioxide.

Comparative Example 11

A coated paper was produced in the same manner as in Example 4, except for the use of unshaped precipitated calcium carbonate with a mean particle diameter of 0.68 μm produced by a causticizing step during a kraft pulp production process.

Comparative Example 12

A coated paper was produced in the same manner as in Example 4, except for the use of a pigment comprising 60 parts of unshaped heavy calcium carbonate with a mean particle diameter of 0.65 μm, and 40 parts of kaolin.

The results of the tests are shown in Table 2.

TABLE 2

|  | Example | | | | Comparative Example | | | | | |
| --- | --- | --- | --- | --- | --- | --- | --- | --- | --- | --- |
|  | 4 | 5 | 6 | 7 | 7 | 8 | 9 | 10 | 11 | 12 |
| Precipitated calcium carbonate: | | | | | | | | | | |
| Shape | Rice grain | Rice grain | Spindle | Spindle | Spindle | Rice grain | Rice grain | Spindle | Unshaped | Unshaped |
| Production method | Causti- cization | Causti- cization | Causti- cization | Causti- cization | Causti- cization | Causti- cization | Carbon dioxide process | Carbon dioxide process | Causti- cization | — |
| Major diameter μm | 1.8 | 3.0 | 2.0 | 4.5 | 2.0 | 1.8 | 1.8 | 2.0 0.68* | 0.65* | |
| Minor diameter μm | 0.4 | 0.6 | 0.35 | 0.8 | 0.35 | 0.4 | 0.4 | 0.35 | | |
| Precipitated calcium carbonate content, parts | 45 | 70 | 60 | 45 | 15 | 95 | 45 | 45 | 45 | — |
| Heavy calcium carbonate content, parts | 20 | — | — | 20 | 45 | — | 20 | 20 | 20 | 60 |
| Kaolin content, parts | 35 | 30 | 40 | 35 | 40 | 5 | 35 | 35 | 35 | 40 |
| White paper glossiness % | 30 | 28 | 29 | 27 | 29 | 27 | 31 | 30 | 27 | 31 |
| Smoothness seconds | 310 | 290 | 300 | 270 | 280 | 150 | 300 | 300 | 280 | 300 |
| Ink erasure | ⊚ | ⊚ | ⊚ | ⊚ | × | ⊚ | ○ | ○ | × | × |
| Ink drying properties | ⊚ | ⊚ | ⊚ | ⊚ | ⊚ | ⊚ | × | × | ⊚ | ⊚ |
| Stalactite | ⊚ | ⊚ | ⊚ | ○ | ⊚ | × | ○ | ⊚ | ⊚ | ⊚ |
| Streaks | ⊚ | ⊚ | ⊚ | ○ | ⊚ | Δ | ⊚ | ⊚ | ○ | ⊚ |

*Mean particle diameter (median): Measured with a centrifugal precipitation particle size distribution measuring device (a product of Seishin Kigyo)

As shown in Table 2, the coated papers of Examples 4 to 7 were excellent in ink drying properties, ink erasure and showed no occurrence of stalactite or streaks. The coated paper of Comparative Example 7 was inferior in terms of ink erasure. The coated paper of Comparative Example 8 underwent marked occurrence of stalactite and streak. The coated papers of Comparative Examples 9 and 10 were poor in ink drying properties. The coated papers of Comparative Examples 11 and 12 were poor in terms of ink erasure.

What is claimed is:

1. A process for preparing a coated printing paper by applying a coating solution containing a pigment and an adhesive to a base paper, which comprises:

coating the base paper with the coating solution containing 30 to 90% by weight, based on 100% by weight of pigment components, of rice grain- or spindle-shaped precipitated calcium carbonate as a pigment component, said precipitated calcium carbonate being produced by slaking calcium oxide with a white liquor, followed by causticization with a green liquor, at a causticizing step during pulp production by the sulfate process or the soda process.

2. The process for preparing a coated printing paper as claimed in claim 1, wherein the rice grain- or spindle-shaped precipitated calcium carbonate has a major diameter of 0.5 to 4.0 μm and a minor diameter of 0.2 to 0.7 μm.

3. The process for preparing a coated printing paper as claimed in claim 1, wherein the coated printing paper is a calendered coated paper calendered so as to have white paper glossiness of higher than 50%.

4. The process for preparing a coated printing paper as claimed in claim 1, wherein the coated printing paper is a dull finish coated paper or a matte finish coated paper, having white paper glossiness of 50% or less.

5. The process for preparing a coated printing paper as claimed in claim 3, wherein the rice grain- or spindle-shaped precipitated calcium carbonate is contained in a proportion of 30 to 80% by weight based on 100% by weight of the pigment components.

6. The process for preparing a coated printing paper as claimed in claim 1, wherein the calcium oxide has been formed in the causticizing step and/or introduced from outside the causticizing step.

7. The process for preparing a coated printing paper as claimed in claim 1, wherein a latex or other water borne adhesive is used in the coating solution.

8. The process for preparing a coated printing paper as claimed in claim 1, wherein the coating solution is applied by using a single or multiple coating method onto the base paper by means of a coater provided with an applicator.

* * * * *